United States Patent Office 3,555,499
Patented Jan. 12, 1971

3,555,499
METHOD AND SYSTEM FOR DETERMINING REFLECTIVITY OF THE OCEAN BOTTOM
Frank H. MacDonald, Irving, and Charles R. Key, Dallas, Tex., assignors to Texas Instruments Incorporated, Dallas, Tex., a corporation of Delaware
Filed May 24, 1968, Ser. No. 731,948
Int. Cl. G01s 9/66
U.S. Cl. 340—3                                16 Claims

ABSTRACT OF THE DISCLOSURE

The bottom loss of a sonar signal reflected from the ocean bottom is determined by generating voltages proportional to the magnitude of signals transmitted to the ocean bottom, the amplitude of the sonar echo from the ocean bottom, the gains and sensitivities of the sonar circuitry, and the depth and absorption characteristics of the ocean. These generated voltages are operated upon according to a preselected function in order to generate an output signal representative of the bottom loss of the sonar signal. Bottom tracking of the ocean bottom is also utilized to eliminate errors caused by reflections other than the actual ocean bottom.

---

This invention relates to improvements in sonar systems, and more particularly to a method and system for providing indications of the reflectivity of the ocean bottom to facilitate the use of sonar in a bottom-bounce mode.

An important operation technique for sonar is the bouncing of sonar signals off the ocean bottom in order to increase the range of signal detection. Under certain environmental conditions, such factors as temperature layering in the ocean can cause acoustic ray refraction which bends the sonar signal propagation path and limits the search range of a sonar system. Bouncing the sonar signal off the ocean bottom is one important method of alleviating the problems of refraction and, therefore, increasing range. Although such operation of sonar in the bottom-bounce mode is advantageous, problems often arise due to the wide variances in the attenuation and absorption of sound by the bottom sediment of the ocean.

The actual propagation loss of sound in the ocean bottom sediment is a very complex function which is almost continuously variable with geography. This function is dependent upon the absorption of sound by each sediment layer and upon the sound reflection caused by impedance discontinuities between sediment layers. Hence, the amount of attenuation of the sonar signal is a function of the content as well as the thickness of the sediment layers. Thus any change in the makeup of the sediment material may change the velocity of sound therethrough. Further, changes in the sediment thickness due to ocean currents and the like may materially affect the loss of the sonar signal by changing the constructive or destructive interference to the signals, as such interference depends upon whether the sediment layers have thicknesses of an even or odd number of wave lengths at the frequency of interest.

It is extremely important to have an accurate indication of the sound attenuation or bottom loss of the sonar wave which is reflected from the ocean floor. However, while techniques have previously been developed for determining this bottom loss, such techniques have generally required manual computations and are time consuming as well as somewhat inaccurate.

For instance, one technique measures the amplitude of the emitted sonar pulse and the amplitude of the return sonar echo, and then manually computes the bottom loss by subtracting the absorption and spreading loss of the signals from the total measured propagation loss. In this method, the amplitudes of the signals are generally hand picked from analog records made during the sonar operation, and the values then later inserted as a computer program for the digital calculation of the bottom loss. In addition to creating the possibility of errors in the manual reading of the amplitudes from analog records, this technique also creates the necessity of correlating bathymetry data which is generated by a separate system. Thus, any error in the correlation of the data obtained by the two separate systems may cause considerable error in the final bottom loss computation, especially in ocean bottom areas having sides sloping at relatively large angles.

Other techniques of determining bottom loss of sonar signals have not been generally practical. For instance, mathematical models created by measurements of the sound velocity of sediment cores taken from the ocean floor have been utilized to calculate the attenuation of a sound wave in the sediment layers. However, such techniques are difficult to employ, are time consuming and are almost prohibitively expensive for general use. Another technique for determining sonar bottom loss utilizes the aid of a physical model, along with in situ measurements of sound velocity. While this technique provides generally accurate information, it is almost prohibitively expensive even in moderately deep ocean areas. Further, the use of such sampling techniques presents problems when operating over a non-uniform depth ocean bottom.

In accordance with the present invention, circuitry is provided to directly generate signals representative of the amplitude of the transmitted and reflected sonar signals. Circuitry also generates electrical signals representative of the ocean depth, the ocean attenuation coefficient, and the gain and sensitivities of the sonar system. The generated signals are operated upon according to a preselected function for the generation of a direct indication of the ocean bottom reflectivity.

In another aspect of the present invention, circuitry is provided to track the ocean bottom within a depth "window" to minimize the probability of error in bottom loss computation caused by spurious signals from layers of plankton and the like.

For a more complete understanding of the present invention and for further objects and advantages thereof, reference may now be had to the following description taken in conjunction with accompanying drawings, in which.

Figure 3:
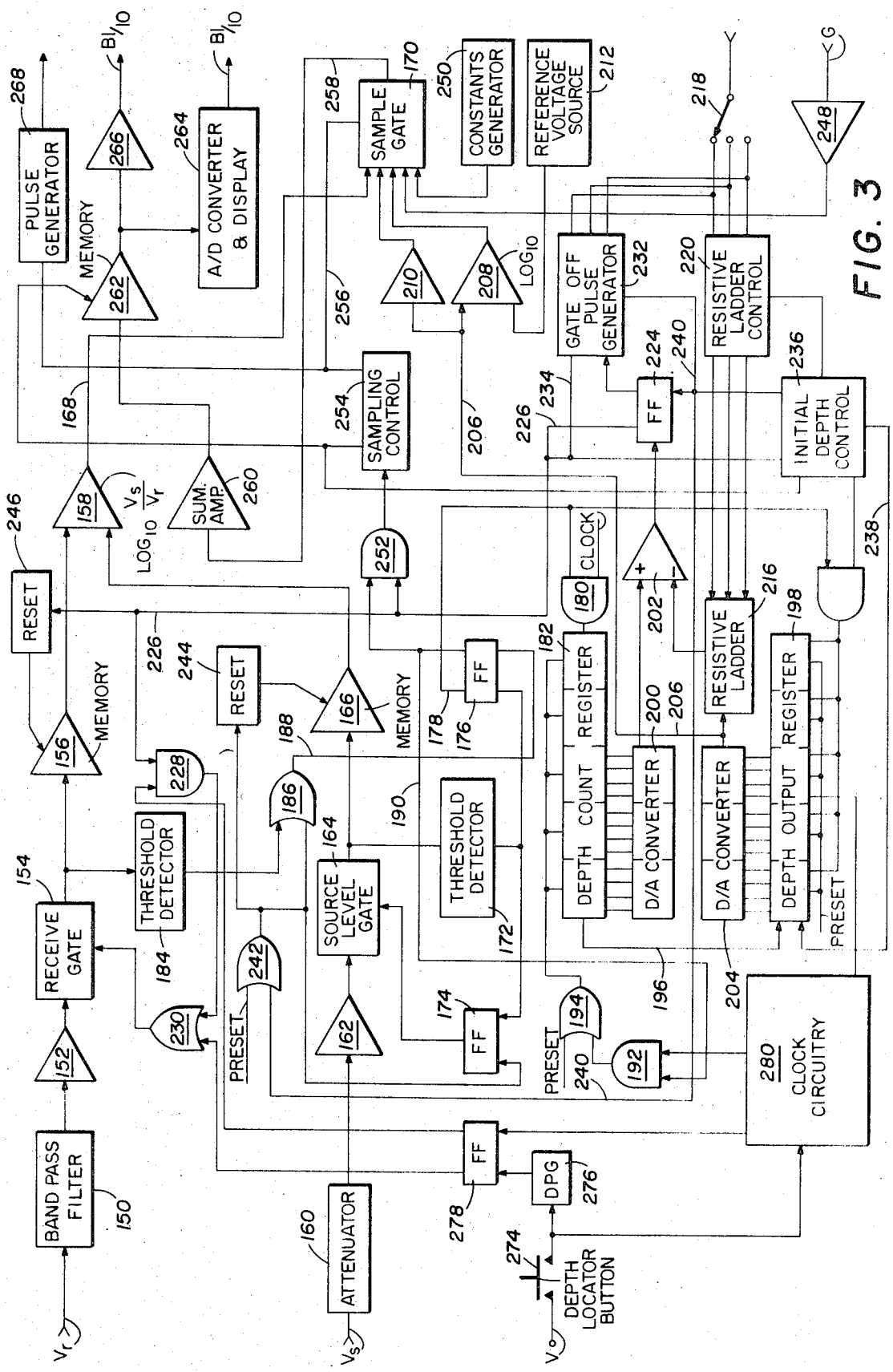
FIG. 3 is a block diagram of another embodiment of the invention.

FIG. 4a–p are diagrams of various voltages during the operation of the system shown in FIG. 3.

Basically, the present invention utilizes the well-known sonar equation:

Transmitted energy = Return energy + Losses    (1)

The losses expressed in the Equation 1 include absorption and spreading losses associated with the properties of the sea water, and additionally refer to the attenuation due to the ocean bottom, termed bottom losses. For the purposes of this invention, it is assumed that all losses other than water absorption and spreading losses are attributed to bottom loss. Thus Equation 1 may be expanded as follows:

$$S = T_s + 20\log_{10}V_s = R - R_s - G + Bl + 20\log_{10}2D + \alpha 2D \quad (2)$$

wherein,

S = sonar source level,
$T_s$ = sensitivity of sonar transmission circuits in db re/microbar per volt,
$V_s$ = peak amplitude of the source level signal applied to the sonar transducer,
R = reflected sonar signal in db = 20 $\log_{10}V_r$,
$V_r$ = the peak amplitude of the signal generated by the sonar transducer in response to the reflected sonar pulse,
$R_s$ = the receiving sensitivity of the sonar circuitry in db re one volt per microbar,
G = system gain in db,
D = ocean depth in fathoms,
Bl = sonar bottom loss in db, and
α = the ocean attenuation coefficient in db per fathom.

The term 20 $\log_{10}2D$ refers to the spherical spreading loss of a sonar signal, assuming a point source and a perfect reflector surface such that the spherical spreading of the two-way path having a length 2D is the same for a one-way path of the length 2D. The term α2D is the absorption associated with the water.

Rearranging Equation 2 and solving it for bottom loss, the following equation is derived:

$$Bl = S - R + Rs + G - 20\log_{10}2D - \alpha 2D \quad (3)$$

Substituting and rearranging, the following equation results:

$$\frac{Bl}{20} = \log_{10} V_s - \log_{10} V_r + \frac{T}{20} + \frac{G}{20} - \log_{10} 2D - \frac{\alpha D}{10} \quad (4)$$

and $$\frac{Bl}{10} = 2\log_{10}\frac{V_s}{V_r} + \frac{T}{10} + \frac{G}{10} - 2\log_{10} 2D - \frac{\alpha D}{5} \quad (5)$$

where, $$T = T_s + R_s = \text{transducer gain} \quad (6)$$

Figure 1:
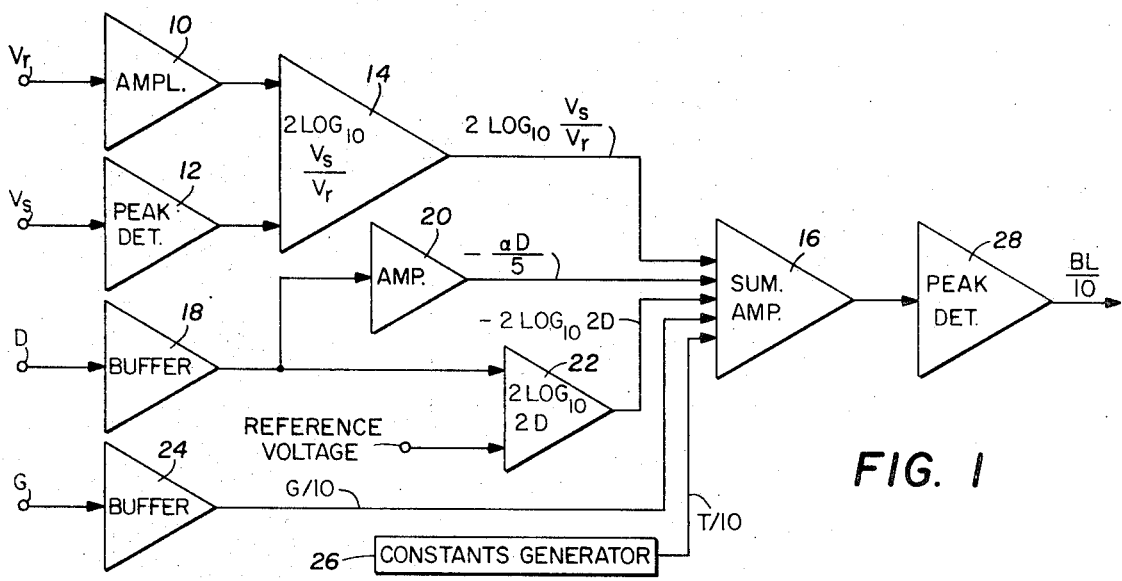
FIG. 1 is a block diagram of the basic bottom loss computer.

FIG. 1 illustrates a block diagram for the solving of Equation 5 according to the invention. The system is constructed as a unit which may be "plugged in" into any conventional sonar, with only minor reference adjustments being required to mate the unit with a particular sonar system.

Referring to FIG. 1, a signal $V_r$ representative of the amplitude of the reflected sonar signal is fed into an amplifier 10 which may include peak detector circuitry. $V_r$ will generally be obtained from a direct connection to the output of the receiving circuitry of the sonar transducer. A signal representative of the amplitude of the transmitted sonar signal, termed $V_s$, is fed into a peak detector, or maximum amplitude detector, 12. The respective outputs of the amplifier 10 and the peak detector 12 are fed into a log circuit 14. Log circuit 14 provides an output representative of the function $$2\log\frac{V_s}{V_r}$$

and feeds the output to an input of a summation amplifier 16.

Additionally, an indication of the depth of the ocean area presently being surveyed, termed D, is fed into a buffer amplifying circuit 18. The output from amplifier 18 is fed into an amplifier 20 which multiplies the ocean depth by a constant to provide an output representative of the function $-\alpha D/5$. This output is fed into another input of the summation amplifier 16. The output from the buffer amplifier 18 is also fed into a log circuit 22 which utilizes a reference voltage input to provide an output signal representative of the function $-2\log_{10}2D$. This signal is also fed into an input of the summation amplifier 16.

Signal representative of the gain of the sonar system, termed G, are fed into a buffer amplifier 24 which generates an output representative of the function $G/10$ as an input to the summation amplifier 16. Additionally, a voltage representative of the sensitivity of the sonar system, termed $T/10$, is fed from a constants generator 26 to an input of the summation amplifier 16. Amplifier 16 sums the five inputs according to Equation 5 to produce an output signal which is fed to a peak detector 28. The output of the peak detector 28 is representative of the bottom loss of the sonar signal, termed $Bl/10$. This output is provided on a real time basis and may be used to provide direct corrections to sonar data.

Figure 2:
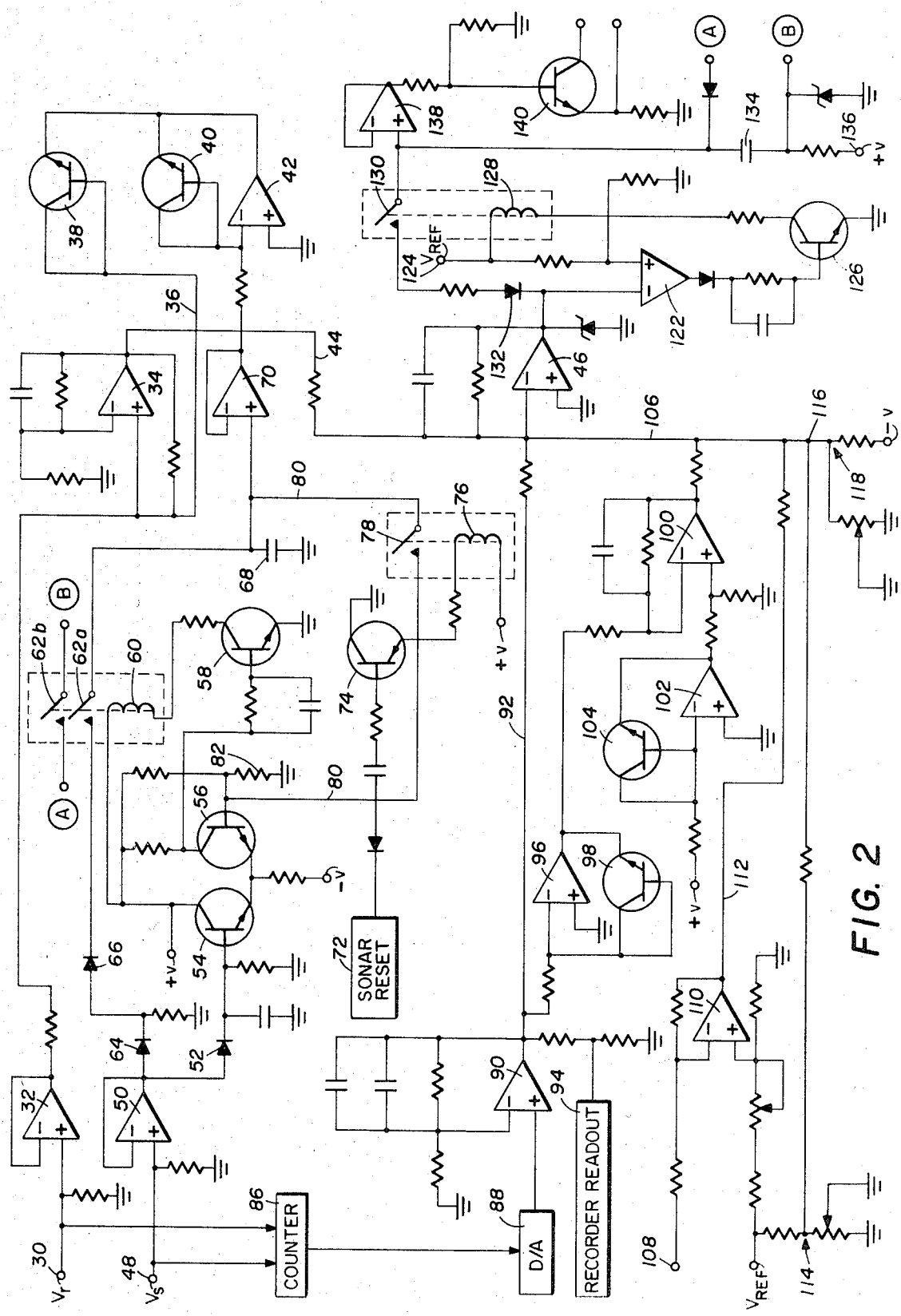
FIG. 2 is a schematic diagram of one embodiment of the system shown in FIG. 1.

FIG. 2 is a detailed schematic of an embodiment of the block diagram shown in FIG. 1. The signal $V_r$ representative of the reflected sonar pulse is fed into an input terminal 30 and to the positive input of a buffer amplifier 32. Amplifier 32 converts the signal $V_r$ to a useable voltage level for the system, and feeds the signal into the positive input of an amplifier 34. If desired, a maximum amplitude detection circuit may be disposed between the amplifiers 32 and 34 to detect the largest amplitude swing of a reflected sonar signal, this largest amplitude swing normally being the desired reflected signal. Amplifier 34, in combination with its associated resistor and capacitor feedback circuitry, injects a current proportional to the denominator of the logarithmic ratio $\log_{10}V_s/V_r$. A description of a suitable circuit for use as amplifier 34, termed the "Howland" circuit, is found in section III.6 of the Application Manual for Computing Amplifiers, by Philbrick Researches, Inc., 1966.

The output from the buffer amplifier 32 is additionally fed via a lead 36 to the collector and base of a transistor 38 connected in a diode configuration. The emitter of transistor 38 is connected to the emitter of a similarly connected transistor 40 which is connected across a differential amplifier 42. As will be later described, transistor 40 and amplifier 42 receive a detected peak of the transmitted sonar signal to provide an indication of the numerator of the logarithmic ratio $\log_{10}V_s/V_r$. Transistors 38 and 40 and amplifier circuit 42 provide a signal to the input of amplifier 34 which is equal to the difference of the diode voltages, and thus equal to $\log_{10}V_s/V_r$. For a more detailed description of the operation of this log ratio circuit, reference is made to section II.28 of Applications Manual for Computing Amplifiers, by Philbrick Researches, Inc., 1966. Amplifier 34 amplifies the logarithmic ratio and feeds the amplified signal via the lead 44 to an input of a summation amplifier 46.

The transmitted sonar pulses $V_s$ are applied to a terminal 48 and fed into one input of a buffer amplifier 50 for conversion to a usable signal level. The buffered signal is then passed through a diode 52 and fed into the input of a differential amplifier comprised of emitter connected transistors 54 and 56. When the rectified signal fed to the base of transistor 54 exceeds a preselected threshold voltage, transistor 56 triggers a transistor 58 on to supply current to a relay coil 60 in order to close the normally open relay contacts 62a and 62b. Transistor 58 maintains relay coil 60 in an energized condition until the amplitude of the transmitted sonar pulse $V_s$ falls to a preselected level below the threshold voltage.

When relay switch contact 62a is closed, the buffered output of the amplifier 50 is passed through blocking diodes 64 and 66 and fed to a capacitor 68. Capacitor 68 is utilized as a memory storage for the amplitude of the detected transmitted sonar signal. The voltage stored on capacitor 68 is amplified by a buffer amplifier 70 and fed into the negative input of the amplifier 42. As previously described, amplifier 42 then generates, in combination with the non-linear diode connected to transistor 40, a signal representative of the logarithm of the transmitted sonar signal $V_s$. The logarithm of the reciprocal of the reflected sonar signal $V_r$ is provided by transistor 38 and is subtracted from the signal provided by amplifier 42. The resulting signal is amplified by the differential amplifier 34 in the manner previously described, and the signal $2 \log_{10} V_s/V_r$ is fed to amplifier 46.

After the generation of each transmitted sonar pulse $V_s$, a sonar reset circuit 72 generates a signal a few seconds before the generation of the next sonar pulse. This reset signal is applied to the base of a power transistor 74 which energizes a relay coil 76 to close a normally open relay switch arm 78. When switch arm 78 is closed, the charge contained upon the capacitor 68 is discharged to ground through a lead 80 and a resistance 82. The peak detection circuitry is then conditioned for the reception of the next transmitted sonar pulse.

The signals $V_r$ and $V_s$ applied to terminals 30 and 48 are also supplied as inputs to a digital counter 86. Counter 86 provides a digital output representative of the time interval between the transmitted sonar pulse and the reception of the reflected sonar pulse. This digital output is fed to a digital-to-analog converter 88, the output of which is fed into a buffer amplifier 90 as an indication of the depth of the ocean at the point being surveyed. Amplifier 90, in combination with its associated resistor-capacitor circuitry, buffers the depth signal and amplifies the signal by a negative constant value to provide an output signal representative of the function $-\alpha D/5$. This output is fed via the lead 92 to the input of the summation amplifier 46. Additionally, the depth output is fed to a recorder readout 94 for display.

The output from the amplifier circuitry 90 is also fed to the negative input of an amplifier 96. A transistor 98 connected in a diode configuration is connected across the amplifier 96 in order to provide a nonlinear logarithmic function which is then fed into the negative terminal of a differential amplifier 100. A reference voltage is fed to an input of an amplifier 102, which in association with a nonlinear diode connected transistor 104 provides a logarithmic output which is fed to the positive terminal of the differential amplifier 100. Differential amplifier 100 provides an output representative of the function $-2 \log_{10} 2D$ via the lead 106 to the input of the summation amplifier 46.

Signals representative of the gain of the sonar system in db are fed to a terminal 108 and to the negative input of a differential amplifier 110. A reference voltage is fed to the positive terminal of the differential amplifier 110 in order to provide an output from the amplifier 110 representative of the function G/10. This output is fed via the leads 112 and 106 to the input of the summation amplifier 46. The reference voltage is also applied across a voltage division circuit 114, with a portion of the voltage being applied from the division network to a summation point 116. A negative reference signal is applied across a voltage division circuit 118 to provide a negative signal to the summation point 116. The resulting electrical signal at point 116 has a magnitude equal to the constant function T/10. This signal is applied via the lead 106 to the input of the summation amplifier 46. The relative magnitudes of the voltage division networks 114 and 118 may be varied in accordance with various physical characteristics of different sonar systems.

Summation amplifier 46 provides an output signal representative of the sum of the various input signals applied thereto according to the Equation 5. This signal is representative of the bottom loss of each sonar pulse. This bottom loss output is applied to the negative terminal of a differential amplifier 122 for comparison against a positive reference voltage applied to terminal 124 and fed to the positive input of the amplifier 122.

Upon the occurrence of an output signal from the summation amplifier 46 above the preselected reference voltage, an output is provided to the base of a transistor 126 which saturates and causes a relay coil 128 to become energized to close a normally open relay switch arm 130. The bottom loss signal from the summation amplifier 46 is passed through a diode 132 and fed into a storage capacitor 134. A reference voltage is applied via a terminal 136 to the opposite side of the storage capacitor 134. The value stored upon the capacitor 134 is fed into the positive input of an amplifier 138. Amplifier 138 inputs to an emitter follower connected transistor 140 to provide an output level representative of the function B1/10.

Capacitor 134 is periodically discharged by the application of a short across terminals A and B due to the periodic closing of the relay switch arm 62b upon the transmission of each sonar pulse. Thus, the amplifier 138 detects the charge upon the storage capacitor 134 during the interval between each sonar ping, and the capacitor 134 is then reset for the application of a new voltage level.

Referring to FIG. 3, another embodiment of the invention is illustrated wherein the depth of the ocean bottom may be accurately tracked to eliminate errors caused by spurious reflections. This system operates on input signals from a sonar system according to Equation 5 in a somewhat similar manner as the system shown in FIG. 2. However, the system shown in FIG. 3 only receives reflected sonar signals which occur during a preselected time in order to eliminate spurious reflections from layers of plankton or the like. A signal $V_r$ representative of the sonar signal reflected from the ocean bottom is fed into a band-pass filter 150 for filtering of noise. Filter 150 may be varied for different applications and for use with different sonar systems. The filtered signal is amplified by an amplifier 152 and fed to a receive gate 154. Gate 154 is opened by circuitry later described only during selected time intervals. If a reflected sonar signal is received during such time intervals, the signal is passed through the gate 154 to a memory circuit 156, the output of which is fed into one input of a log ratio circuit 158.

A signal $V_s$ representative of the transmitted sonar pulse is fed through an attenuator circuit 160 which is adjustable in order to mate the present system with any existing sonar system. The output of the attenuator 160 is amplified by an amplifier 162 and passed to a source level gate 164. As will be later described, gate 164 is opened only when a transmitted sonar pulse is due to pass the amplified signal to a memory circuit 166 for storage thereof. The output of the memory circuit 166 is fed into another input of the log ratio circuit 158. The log circuit 158 provides an output on lead 168 which is representative of the function $2 \log_{10} V_s/V_r$ the output being fed into an input of a sample gate 170.

When the sonar pulse is transmitted through the source level gate 164, a threshold detector 172 senses the presence of the transmitted pulse and generates an output signal which is applied to the inputs of a flip-flop circuit 174 and a flip-flop circuit 176. In response to the presence of an output from the detector 172, the flip-flop 174 provides a signal to the source level gate 164 to close the gate for the prevention of further passage of signals therethrough until the next sonar cycle. Additionally, in response to an output from the detector 172, the flip-flop circuit 176 provides an output on lead 178 which is applied to an AND gate 180 in order to start a digital depth-count register 182. Register 182 starts counting a four kHz. clock pulse applied through the gate 180 to measure the depth of the ocean in 0.1 fathom step increments.

The depth count register 182 continues counting until a reflected sonar pulse $V_r$ is passed through the receive gate 154 and detected by a threshold detector 184. Detector 184 provides an output through gate 186 and via lead 188 to the flip-flop circuit 176. In response, flip-flop 176 changes the signal state applied to the lead 178 to stop the counting of the depth count register 182. The flip-flop circuit 176 also provides a signal via lead 190 to a gate 192 and a gate 194 to cause the digital count registered on the depth count register 182 to be transferred via a lead 196 to a depth output register 198.

The output from the depth count register 182 is fed to a digital-to-analog converter 200 which provides an analog signal representative of the registered depth to the positive terminal of a comparison circuit 202. The depth count which was transferred to the depth output register 198 on the prior sonar cycle is transferred to a digtal-to-analog converter 204 which provides an analog output via the lead 206 to the inputs of a log circuit 208 and an amplifier 210. A source 212 provides a reference voltage to log circuit 208. In response, log circuit 208 produces a logarithmic function of the ocean depth which is fed to an input of the sample gate 170. The amplifier 210 multiplies the ocean depth by a constant to provide an output representative of the function $-\alpha_D/5$ to one of the inputs of the sample gate 170.

The output of the digital-to-analog converter 204 is also fed to a resistive ladder network 216, the resistive value of which may be manually set by a switch arm 218. Switch arm 218 controls the operation of a resistive ladder control 220 which in turn controls the value of the resistance of the resistive ladder network 216. Switch arm 218 is moveable between a number of switch contacts, each switch contact representative of a depth window width such as 100 fathoms, 200 fathoms, and 400 fathoms. For instance, upon the setting of the switch arm 218 to a window width of 100 fathoms, the ocean bottom would be tracked by the system such that only sonar pulses reflected from a depth within the selected window width would be received and passed through the receive gate 154. A selected window width of 100 fathoms would pass only signals reflected from ±50 fathoms from the previously measured depth.

The resistive ladder network 216 attenuates the analog depth count from converter 204 to the upper level of the selected depth "window." The attenuated analog output from the resistive ladder 216 is fed to the negative input of the comparison circuit 202, where the prior depth count is compared with the latest depth count. When the attenuated output from the resistive ladder 216 is sufficiently similar to the analog output provided by the converter 200, the comparison circuit 202 generates a signal to a flip-flop circuit 224. Flip-flop 224 then generates a gate enabling pulse via lead 226 through gates 228 and 230 in order to open receive gate 154 for the reception of a reflected sonar pulse. If the inputs to the comparison circuit 202 are not substantially equal, comparison circuit 202 does not operate the flip-flop circuit 224 to open the receive gate 154.

A "gate off" pulse generator 232 is also set by the switch arm 218 in order to generate a "gate off" pulse after a predetermined time dependent upon the position of the switch arm 218. This gate off pulse is applied via lead 234 and lead 226 to gates 228 and 230 in order to turn the receive gate 154 off. Thus, the receive gate 154 is opened only when a reflected pulse from within the selected depth "window" is expected, and the receive gate 154 is closed after the time for a valid reflected pulse has passed. Spurious reflections from other depths are thus eliminated.

For the first cycle of operation of the system, an initial depth control circuit 236 includes switches which may be manually dialed by the operator of the system to set an initial depth into the system through a lead 238 into the depth output register 198. After the first cycle of operation, this initial depth setting is replaced by the newly detected depths. In this manner, the depth "window" is tracked along the ocean bottom, with the midpoint of the window always lying on the last detected depth.

A signal representative of the sonar gain function is fed into the input of a buffer amplifier 248 which provides an output directly to an input of the sample gate 170. Additionally, a generator 250 provides a reference voltage equal to the function $T/10$ to the input of the sample gate 170.

The enabling pulse provided by the flip-flop circuit 224 via lead 226 also enables a gate 252 which gates a sampling conrtol circuit 254 on. Control cricuit 254 then provides an enabling signal via a lead 256 to open the sample gate 170. When the sample gate 170 is opened, the signals applied to the inputs of the sample gate are fed via a lead 258 to the input of a summation amplifier 260, wherein the input signals are summed according to Equation 5 to provide an indication of the bottom loss of the ocean surface being considered.

The output of summation amplifier is fed to the input of a memory circuit 262 which provides an output to an analog-to-digital converter and display circuit 264. The memory circuit 262 also provides an output to a buffer amplifier circuit 266 to generate an analog output representative of the bottom loss. The output from the sampling control 254 is also applied to a pulse generator 268 which generates command signals for the control of suitable printing circuitry which records the computed bottom loss.

In the case when a reflected sonar pulse is not received or is not of sufficient amplitude to trigger the depth count register 182 off, the count register 182 will continue to register depth increments until the gate off pulse is generated by the generator 232. The analog output provided by the converter 200 will in this case be greater than the previous depth provided by the converter 204 by one-half of the selected gate width. When the gate off pulse is generated by the generator 232, the flip-flop circuit 224 triggers a gate control (not shown) to cause the resistive ladder control 220 to double the resistance of the ladder circuit 216. The amount of attenuation applied between the converter 204 and the comparator circuit 202 is thus doubled.

Instead of the usual one-half gate width attenuation provided by the ladder 216, in this instance a full gate width attenuation will be inserted to place the depth "window" at the same depth as during the last sonar cycle. A not-tracking light (not shown) will be illuminated to alert the operator. If a reflected sonar pulse is not received within a set number of cycles, the operator depresses a depth locator button 274 which triggers a delayed pulse generator 276 to activate a flip-flop circuit 278. Flip-flop circuit 278 provides signals to close the receive gate 154 and to revert the system back to the initial operating condition. An initial depth is then dialed into the system and operation again begins without accumulation of error.

With the generation of a gate off pulse from the pulse generator 232, an indication is provided via a lead 240 to a gate 242 and to a reset circuit 244 in order that the memory circuit 166 may be reset for the reception of another transmitted pulse. This indication also is passed through gate 242 to the flip-flop circuit 174 in order to open the source level gate 164. Additionally, the gate off pulse from generator 232 triggers a reset circuit 246 to reset the memory 156 for the storing of another reflected sonar pulse.

Clock circuitry 280 provides accurate series of clock pulses to portions of the circuitry to control the timing of various events in the system.

Figure 4:
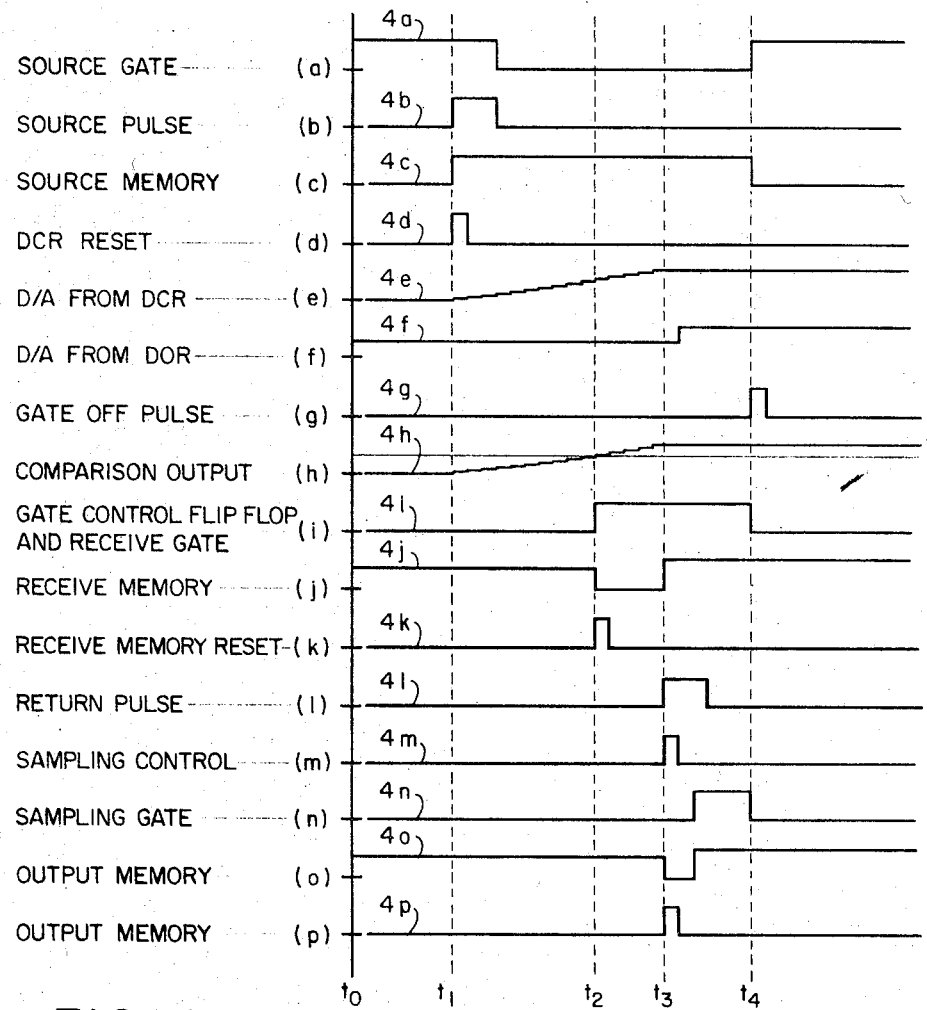

The overall operation of the system will become more apparent by reference to FIG. 4 which illustrates the time sequence of various events in the system operation. The depth count register 182 is set to zero and an initial depth is set into the depth output register 198 by the initial depth control circuit 236. The source level gate 164 is initially open as represented by the waveform $4a$ at $t_0$. The occurrence of a sonar source pulse as shown in FIG. $4b$ at the time $t_1$, starts the train of events for one cycle of the system. The source pulse is transmitted through the attenuator 160, the amplifier 162 and through the open source level gate 164 to the memory 166 which stores the indication as shown in the waveform 4c. When the source pulse shown in FIG. 4b terminates, the source level gate 164 is closed by a gate signal applied by the flip-flop 174. The output of the memory circuit 166 is fed to the log circuit 158.

Indications from the threshold detector 172 of the occurrence of the source pulse at $t_1$ causes the flip-flop 176 to reset and enable the depth count register 182 with a pulse shown in FIG. 4d. The depth count register 182 begins counting to provide an analog signal output from the converter 200 shown in FIG. 4e. The analog output shown as FIG. 4f provided by the converter 204 remains at the previously set value during this period.

At time $t_2$, the analog output from the converter 200 equals the analog output applied from the converter 204 through the resistive ladder 216, and the comparison output shown in FIG. 4h operates the flip-flop circuit 224 to generate a gate on pulse shown in FIG. 4i to enable the receive gate 154. Also at time $t_2$, the receive memory 156 is reset as shown in FIG. 4j by a pulse shown in FIG. 4k.

The return pulse shown in FIG. 4l occurs at time $t_3$. The return pulse is sensed by the memory circuit 156, as shown in FIG. 4j, which then provides an output to the log circuit 158. Detection of the return pulse by the threshold detector 184 triggers the sampling control on 234 at time $t_3$ as shown in FIG. 4m. Control 234 opens the sample gate 170, as shown in FIG. 4n, to feed the various input signals to the summation amplifier 240. An indication of the bottom loss is then generated as previously described. The ouput memory circuit 262 is reset by a pulse shown in FIG. 4p for reception of the new bottom loss indication, as shown in FIG. 4o.

At time $t_4$, the gate off pulse generator 252 generates the pulse shown in FIG. 4g to close the receive gate 154 (FIG. 4i) and to open the source gate 164 (FIG. 4a). Additionally, at the time $t_4$, the source memory shown in FIG. 4c is reset, as is the sampling gate shown in FIG. 4n.

Although the present invention has been described with respect to several specific embodiments, it is to be understoood that various changes and modifications will be suggested to one skilled in the art, and it is intended to cover such changes and modifications in the appended claims.

What is claimed is:

1. A system for providing substantially real time indications of the ocean bottom loss of sonar signals comprising:
   (a) means for generating electrical signals representative of the energy of the transmitted sonar signals,
   (b) meane for generating electrical signals representative of the water absorption losses of the sonar signals,
   (c) means for generating electrical signals representative of the spreading losses of the sonar signals, and
   (d) means responsive to said electrical signals for generating an output signal representative of the ocean botom loss of the sonar signals.

2. A system for determining the bottom loss of sonar signals reflected from the ocean floor comprising:
   (a) means for generating electrical signals representative of the amplitude of transmitted and reflected sonar signals,
   (b) means for generating electrical signals representative of the depth of the ocean,
   (c) means for generating electrical signals representative of the sonar gains, and
   (d) means operable in dependence upon said generated signals for providing indications of the bottom loss of the sonar signals.

3. The system of claim 2 and further comprising means to prevent the generation of signals in response to sonar reflections from levels other than the ocean bottom.

4. The system of claim 3 and further comprising tracking means for maintaining the upper and lower depth limits between which sonar signals must be reflected for electrical signals representative thereof to be generated.

5. The system of claim 2 wherein said means operable in dependence upon said generated signals provides indications of the bottom loss by subtracting water absorption losses and spreading losses from the transmitted sonar energy.

6. A system for use with sonar apparatus to determine the reflectivity of an ocean bottom comprising:
   (a) means for generating a first signal representative of the log of the ratio of the magnitude of sonar signals transmitted to and reflected from the ocean bottom,
   (b) means for generating a second signal representative of the log of the ocean depth,
   (c) means for generating a third signal representative of the ocean depth multiplied by the ocean attenuation coefficient,
   (d) means for generating fourth signals representative of gains of the sonar apparatus, and
   (e) means for summing said first and fourth signals and subtracting said second and third signals to provide an output signal representative of the bottom loss of the sonar signals.

7. The system of claim 6 and further comprising depth tracking means for maintaining indications of upper and lower depth levels between which a sonar signal must be reflected in order that the magnitude of the reflected signal is considered for the generation of said first signal.

8. The system of claim 7 wherein said depth tracking means comprises:
   (a) first and second register means for providing indications of the present and last prior depth determinations made by said system,
   (b) means for selectively attenuating the last prior depth determination,
   (c) means for comparing the magnitudes of the present and attenuated last prior depth determinations, and
   (d) means for receiving reflected sonar signals only if said magnitudes are equal.

9. The system of claim 8 wherein said means for selectively attenuating comprises an impedance network having a resistance variable in accordance with preselected ocean depth interval calibrations.

10. The system of claim 8 wherein each of said first and second register means comprises a digital register with a digital-to-analog converter connected to the output thereof.

11. The system of claim 10 wherein said first register means is energized at the transmission of a sonar signal and is deenergized at the reception of a sonar signal reflected from a depth between said upper and lower depth levels.

12. The system of claim 11 and further comprising means to transfer the output of said first register means to the input of said second register means during each sonar signal cycle.

13. The method for determining the reflectivity of an ocean bottom comprising:
   (a) generating electrical representations of the amplitude of signals transmitted to and reflected from the ocean bottom,
   (b) generating electrical representations of the depth of the ocean at the location of signal transmission,
   (c) generating electrical representations of the gains of the signal transmission and reception system, and
   (d) generating in response to said electrical representations output signals representative of the reflectivity of the ocean bottom.

14. The method of claim 13 and further comprising generating electrical representations of the amplitude of signals reflected only from a preselected depth interval.

15. The method of claim 14 and further comprising changing said preselected depth interval in accordance with changes in the depth of the ocean floor.

16. The method of determining indications of the ocean bottom loss of sonar signals comprising:
 (a) generating electrical signals representative of the energy of the transmitted sonar signals,
 (b) generating electrical signals representative of the water absorption losses of the sonar signals,
 (c) generating electrical signals representative of the spreading losses of the sonar signals, and
 (d) in response to said electrical signals generating an output signal representative of the ocean bottom loss of the sonar signals.

References Cited

UNITED STATES PATENTS 3,346,067   10/1967   Schroeder _____ 181—0.5

RICHARD A. FARLEY, Primary Examiner

U.S. Cl. X.R.

181—0.5